(12) United States Patent
Basin et al.

(10) Patent No.: US 9,856,958 B2
(45) Date of Patent: Jan. 2, 2018

(54) TORSIONAL VIBRATION DAMPER

(71) Applicant: GM Global Technology Operations LLC, Detroit, MI (US)

(72) Inventors: Leonid Basin, Farmington Hills, MI (US); Shushan Bai, Ann Arbor, MI (US); Dongxu Li, Troy, MI (US); Farzad Samie, Franklin, MI (US); Ioan Napau, Rochester Hills, MI (US); Gary H. Paelicke, Saline, MI (US); Clinton E. Carey, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 14/962,665

(22) Filed: Dec. 8, 2015

(65) Prior Publication Data
US 2017/0159784 A1   Jun. 8, 2017

(51) Int. Cl.
| F16H 45/02 | (2006.01) |
| F16F 15/12 | (2006.01) |
| F16F 15/123 | (2006.01) |
| F16D 3/12 | (2006.01) |
| F16D 25/0635 | (2006.01) |

(52) U.S. Cl.
CPC ......... *F16H 45/02* (2013.01); *F16F 15/1206* (2013.01); *F16F 15/1232* (2013.01); *F16D 3/12* (2013.01); *F16D 25/0635* (2013.01); *F16H 2045/0268* (2013.01); *F16H 2045/0294* (2013.01)

(58) Field of Classification Search
None
See application file for complete search history.

(56) References Cited

U.S. PATENT DOCUMENTS

| 2,264,002 A | 11/1941 | Patterson et al. |
| 3,059,740 A | 10/1962 | Roche |
| 3,296,887 A | 1/1967 | Larsen |
| 4,177,885 A | 12/1979 | Ross |
| 4,240,532 A | 12/1980 | Blomquist |
| 4,289,048 A | 9/1981 | Mikel et al. |
| 4,412,606 A | 11/1983 | Loizeau |
| 4,437,551 A | 3/1984 | Gimmler et al. |
| 4,638,684 A | 1/1987 | Maucher |
| 4,638,897 A | 1/1987 | Nishimura et al. |
| 4,646,886 A | 3/1987 | Nishimura et al. |

(Continued)

*Primary Examiner* — Jacob S. Scott

(57) ABSTRACT

A torsional vibration damper includes a planetary gear set connected to a transmission input shaft, including a sun gear, a carrier, and a ring gear. A spring cage includes a first spring support member connected to the ring gear having multiple first spring contact members. A second spring support member is connected to the carrier and rotates with respect to the first spring support member. The second spring support member has multiple second spring contact members angularly oriented with respect to the first spring contact members. Multiple springs having opposed ends are positioned between and are compressed by rotation of the first or the second spring support member. The springs compress and extend to absorb vehicle engine vibration pulses. Each end of the springs has one of the multiple first spring contact members and or one of the multiple second spring contact members positioned proximate thereto.

18 Claims, 5 Drawing Sheets

(56) References Cited

U.S. PATENT DOCUMENTS

| | | | |
|---|---|---|---|
| 5,313,794 A | | 5/1994 | Hara et al. |
| 5,466,195 A | * | 11/1995 | Nogle ................... F16H 47/08 |
| | | | 475/55 |
| 6,099,434 A | * | 8/2000 | Sasse ..................... F16F 15/12 |
| | | | 192/30 V |
| 6,266,958 B1 | | 7/2001 | Sasse et al. |
| 6,854,580 B2 | | 2/2005 | Braford, Jr. |
| 7,967,561 B2 | | 6/2011 | Samie et al. |
| 8,579,719 B2 | | 11/2013 | Mabrey |
| 2003/0061809 A1 | | 4/2003 | Okada et al. |
| 2005/0262837 A1 | | 12/2005 | Shue |
| 2007/0169470 A1 | | 7/2007 | Fukunaga et al. |
| 2009/0139819 A1 | * | 6/2009 | Jameson ................ F16H 45/02 |
| | | | 192/3.29 |
| 2010/0077743 A1 | | 4/2010 | Mori et al. |
| 2012/0080281 A1 | | 4/2012 | Takikawa et al. |
| 2012/0205213 A1 | | 8/2012 | Sudau et al. |
| 2016/0186834 A1 | * | 6/2016 | Dieckhoff ........... F16F 15/1206 |
| | | | 475/329 |
| 2017/0219047 A1 | * | 8/2017 | Grossgebauer ....... F16F 15/035 |
| | | | 188/267 |

* cited by examiner

TORSIONAL VIBRATION DAMPER

FIELD

The present disclosure relates to a powertrain having a torsional vibration damper or isolator, and more particularly to a powertrain having a planetary gear set incorporated into a vibration damper in order to reduce torsional vibration between an output of an engine and an input of a transmission.

BACKGROUND

The statements in this section merely provide background information related to the present disclosure and may or may not constitute prior art.

Motor vehicle engines produce torsional vibration that is undesirable to transmit through the powertrain and driveline to the motor vehicle. Typically, a torsional isolator or damper is used to isolate or reduce the torsional vibration transmitted from the engine to the transmission. The torsional damper can be placed within a torque converter between a torque converter lock up clutch and an input shaft of the transmission. Known torsional dampers use one or more springs to store energy and to dampen an energy transfer path between the engine and the transmission. However, in certain powertrain configurations the torsional damper is insufficient to isolate the torsional vibrations given the design space. For example, in powertrains having continuous engine torque pulsation, an increase in vibrational magnitude and a decrease in vibrational frequency occur which known spring design vibration dampers being insufficient to isolate, thereby requiring improvement over known vibration dampers.

Accordingly, there is room in the art for a powertrain having a vibration damper that reduces torsional vibration due to continuous engine torque pulsation.

SUMMARY

The present disclosure provides an example of a torsional vibration damper for a motor vehicle. The torsional vibration damper for a motor vehicle includes a planetary gear set connected to a transmission input shaft, the planetary gear set including a sun gear, a carrier, and a ring gear. A spring cage includes a first spring support member connected to the ring gear. The first spring support member has multiple first spring contact members. A second spring support member is connected to the carrier and is rotatable with respect to the first spring support member. The second spring support member has multiple second spring contact members, the second spring contact members angularly oriented with respect to the first spring contact members. Multiple springs each having opposed ends are positioned between and are compressed by rotation of one of the first spring support member or the second spring support member. Each of the opposed ends of the multiple springs have one of the multiple first spring contact members and one of the multiple second spring contact members positioned proximate thereto.

In one example of the torsional vibration damper for a motor vehicle of the present disclosure, each of the second spring contact members is divided into a first contact member portion and a second contact member portion.

In yet another example of the torsional vibration damper for a motor vehicle of the present disclosure, the first spring contact member is coaxially aligned on a first member longitudinal axis which intersects with a central axis of the springs; and each of the first contact member portion and the second contact member portion are coaxially aligned on a second member longitudinal axis which intersects with the central axis of the springs.

In yet another example of the torsional vibration damper for a motor vehicle of the present disclosure, the angular orientation defines a perpendicular orientation between the second member longitudinal axis and a first member longitudinal axis of the first spring contact member.

In yet another example of the torsional vibration damper for a motor vehicle of the present disclosure, a spacing between the first contact member portion and the second contact member portion provides clearance for positioning the first spring contact member between the first contact member portion and the second contact member portion in a non-deflected condition of the springs.

In yet another example of the torsional vibration damper for a motor vehicle of the present disclosure, the sun gear is connected for rotation to the transmission input shaft and the planetary gear set includes multiple planet gears rotatably supported on the carrier, each meshed with the sun gear; and the ring gear is meshed with the planet gears.

In yet another example of the torsional vibration damper for a motor vehicle of the present disclosure, the sun gear is splined to a torque converter hub which is connected to the transmission input shaft.

In yet another example of the torsional vibration damper for a motor vehicle of the present disclosure, a connection plate is directly connected to the first spring support member.

In yet another example of the torsional vibration damper for a motor vehicle of the present disclosure, a torque converter lock-up clutch plate is fixed to the connection plate.

In yet another example of the torsional vibration damper for a motor vehicle of the present disclosure, a torque converter lock-up clutch pressure plate is coupled to the torque converter lock-up clutch plate when the clutch is closed.

In yet another example of the torsional vibration damper for a motor vehicle of the present disclosure, the angular orientation defines a perpendicular orientation of the first and the second spring contact members.

In yet another example of the torsional vibration damper for a motor vehicle of the present disclosure, the second spring support member includes a portion defining a semi-spherical shape having an arc length greater than 90 degrees.

In yet another example of the torsional vibration damper for a motor vehicle of the present disclosure, a spring support tube is connected to individual ones of the first spring contact members or the second spring contact members, with the spring support tube received within a central bore of each of the springs.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
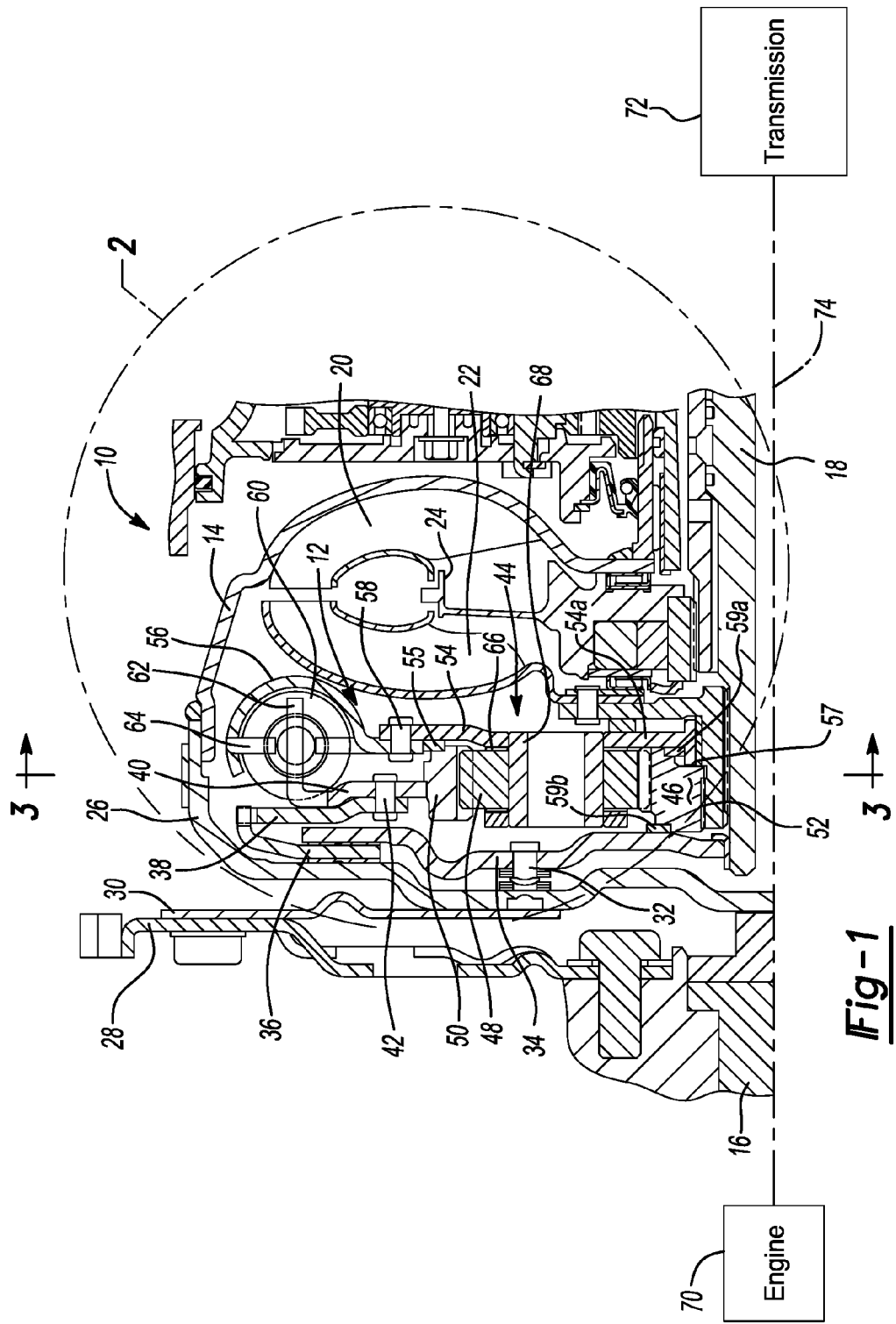
FIG. 1 is a front cross sectional view of a motor vehicle planetary damper according to the principles of the present disclosure.

With reference to FIG. 1, a transmission-drive system 10 for a motor vehicle includes a torsional vibration damper 12 positioned within a torque converter assembly 14. The torsional vibration damper 12 isolates engine torque pulsations between an engine drive component 16 and a transmission input shaft 18.

The torque converter assembly 14 generally includes a pump 20, a turbine 22, and a stator 24 positioned within a torque converter housing 26. The pump 20 is coupled to the torque converter housing 26 and driven by the engine drive component 16 such as a propeller shaft. The turbine 22 is fluidly driven by rotation of the pump 20. The stator 24 is located between the pump 20 and the turbine 22 and is used to multiply torque within the torque converter assembly 14. The torque converter housing 26 is flexibly connected to an engine interface 28, for example by fasteners through a flex plate 30. The torque converter assembly 14 also includes a lock-up clutch 32 that is operable to selectively mechanically couple the pump 20 to the turbine 22 using a lock-up clutch piston or pressure plate 34 connected to a lock-up clutch plate 36. The input to the torsional vibration damper 12 is provided through a connection plate 38 fixed to the lock-up clutch plate 36.

The torsional vibration damper 12 is coupled between the connection plate 38 and the transmission input shaft 18 in order to reduce torsional vibration in a path between the engine drive component 16 and the transmission shaft 18 when the torque converter clutch is closed. The connection plate 38 is fixed to a first spring support member 40, for example by multiple fasteners 42 (only one of which is shown in this view) such as rivets. To increase the effective range of torsional vibration damping, the torsional vibrational damper 12 includes a planetary gear set 44. Components of the planetary gear set 44 include a sun gear 46, multiple pinion gears 48, and a ring gear 50.

The sun gear 46 has internal gear teeth meshing with a spline gear 52 of the transmission input shaft 18. The multiple pinion gears 48 individually rotating about the sun gear 46 each have external gear teeth meshing with external gear teeth of the sun gear 46. The external gear teeth of each of the pinion gears 48 are also meshed to internal gear teeth of the ring gear 50 which is positioned having the pinion gears 48 internal to the ring gear 50. The pinion gears 48 are individually rotatably mounted to separate pinion shafts that are connected to a carrier 54. A washer 55 is positioned between the carrier 54 and the ring gear 50, allowing free rotation between the ring gear 50 and the carrier 54. The carrier 54 includes a carrier portion 54a which is rotatably supported using a bushing 57 to a turbine hub 88 described in greater detail below. Additional washers 59a, 59b are positioned about the sun gear 46 to allow free rotation between the sun gear 46, the pressure plate 34, and the carrier portion 54a. According to several aspects, the torsional vibrational damper 12 together with the torque converter assembly 14 are each connected to the transmission input shaft 18, and therefore both co-rotate as the torque converter assembly 14 transfers power from the engine drive component to rotate the transmission input shaft 18.

The torsional vibration damper 12 also includes a second spring support member 56 connected to the carrier 54 by multiple fasteners 58 such as rivets, only one of which is shown in this view. The second spring support member 56 has an arc or semicircular shape that receives multiple springs 60. The first spring support member 40 and the second spring support member 56 together support and contact each of the springs 60. The first spring support member 40 includes multiple first spring contact members 62 integrally connected to and extending from the first spring support member 40 that are oriented at a first angle with respect to the transmission input shaft 18. According to several aspects the first angle is substantially parallel to a longitudinal axis of the transmission input shaft 18. The second spring support member 56 includes multiple second spring contact members 64 integrally connected to and extending from the second spring support member 56 that are oriented at a second angle different from the first angle of the first spring contact members 62. According to several aspects, the second angle is oriented perpendicular to the first angle and therefore perpendicular to the longitudinal axis of the transmission input shaft 18.

The first spring contact members 62 and the second spring contact members 64 each directly contact ends of the springs 60 to compress the springs 60. The multiple springs 60, which according to several aspects are compression springs, are positioned between and are compressed by relative angular rotation between the first spring support member 40 and the second spring support member 56, as the first spring support member 40 angularly rotates with respect to the second spring support member 56. The angular orientation, and in particular the perpendicular orientation of the second angle of the second spring contact members 64 with respect to the first angle of the first spring contact members 62 ensures that an even compression of each of the springs 60 occurs over an entire range of spring compression, preventing offset loads from being applied to the springs 60, and therefore mitigating against lateral or spring radial deflection that could result in frictional contact between a body or coil of the springs 60 and either of the first spring support member 40 or the second spring support member 56.

The second spring support member 56 is connected to the carrier 54 which as previously noted rotatably supports the pinion gears 48. Torsional vibration reduction is achieved in part by compression and subsequent expansion of the springs 60, which store the energy received by angular rotation between the first spring support member 40 and the second spring support member 56.

The first spring support member 40 is fixed to the ring gear 50. The second spring engagement element 56 is connected to the carrier 54 using the multiple fasteners 58 such as rivets. The carrier 54 rotates with respect to the transmission input shaft 18 and the planetary gear set 44. The carrier 54 is restrained in its arc of rotation with respect to the first spring support member 40 by compression and expansion of the springs 60. To rotatably connect the pinion gears 48 to the carrier 54, a needle bearing 66 is positioned between each of the pinion gears 48 and a pinion shaft 68, which is connected to the carrier 54. The sun gear 46 is connected to and drives the transmission input shaft 18, therefore torque from an engine 70 is transferred through the torsional vibration damper 12 and the transmission input shaft 18 to a transmission 72 when the torque converter clutch is closed. The transmission input shaft 18 and the torsional vibration damper 12 including the planetary gear set 44 coaxially rotate with respect to a longitudinal central axis 74 of the transmission input shaft 18.

Figure 2:
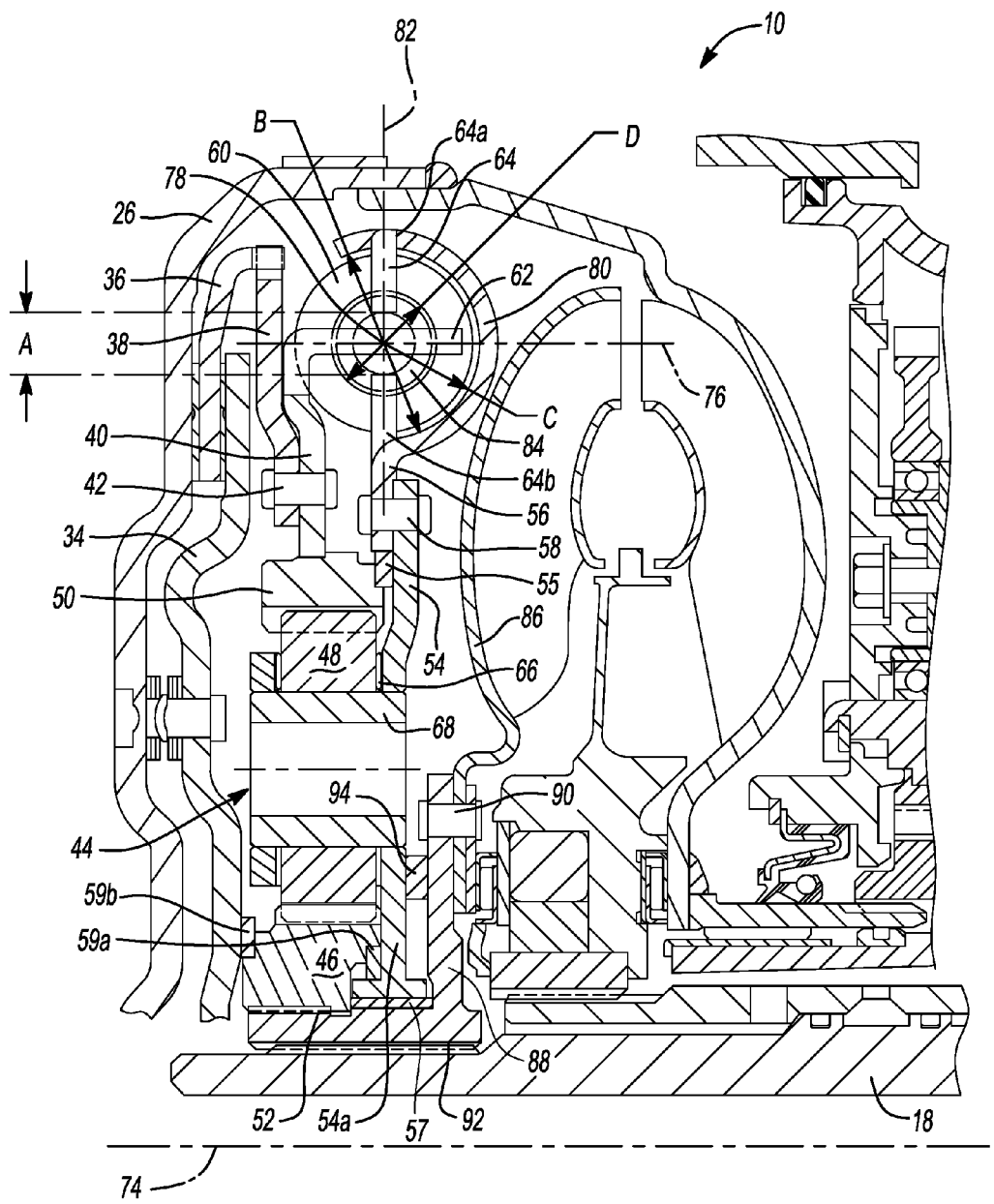
FIG. 2 is a front cross sectional view of area 2 of FIG. 1.

Referring to FIG. 2, each of the multiple first spring contact members 62 are arranged and function similarly, therefore an exemplary one of the first spring contact members 62 is discussed as follows. The first spring contact members 62 are oriented co-axial to a first member longitudinal axis 76. The first member longitudinal axis 76 intersects a central axis 78 of one of the springs 60. Each of the multiple first spring contact members 62 can be formed for example by bending material of the first spring support member 40.

An exemplary one of the second spring contact members 64 is also shown which are divided into a first contact member portion 64a and a second contact member portion 64b extending from directly opposed sides of a spring receiving portion 80 of the second spring support member 56. Each of the first contact member portion 64a and the second contact member portion 64b are coaxially aligned on a second member longitudinal axis 82. The second member longitudinal axis 82 also intersects the central axis 78 and according to several aspects is oriented substantially perpendicular to the first member longitudinal axis 76. Each of the first contact member portion 64a and the second contact member portion 64b are bent into position using a metal forming operation such that the first contact member portion 64a and the second contact member portion 64b are created as a single part with the spring receiving portion 80 of the second spring support member 56.

A central spacing "A" between the first contact member portion 64a and the second contact member portion 64b provides clearance to freely receive one of the first spring contact members 62. One of the first spring contact members 62 and one of the second spring contact members 64 together contact each end of both opposite ends of each of the multiple springs 60 in a non-deflected condition of the springs 60. During angular rotation between the first spring support member 40 and the second spring support member 56, the perpendicular orientation of the first spring contact members 62 and the second spring contact members 64 provides for even axial compression of the springs 60, thereby mitigating against the springs 60 frictionally contacting the first spring support member 40 or the second spring support member 56 during spring compression. Lateral movement of the springs 60 is therefore constrained by the second spring contact members 64 connected to the carrier 54. The perpendicular orientation of the first spring contact members 62 with respect to the second spring contact members 64 mitigates against or precludes a side-force acting on or resulting from deflection of the springs 60 that would allow the springs 60 to contact or push against the first spring support member 40 which is connected to the ring gear 50.

The spring receiving portion 80 defines a semi-spherical shape having an inner diameter "B" which is larger than a diameter of the spring 60 to allow free axial expansion and compression of the spring 60. According to several aspects, the spring receiving portion 80 semi-spherical shape defines an arc length greater than 90 degrees about a radius of curvature "C" defined with respect to the central axis 78 of the springs 60. The semi-spherical shape of the spring receiving portion 80 also assists in retaining the springs 60. The spring receiving portion 80 semi-spherical shape is created using a metal forming operation to avoid secondary welding. One or both of the first spring contact member 62 and the second spring contact member 64 can include one of multiple spring support tubes 84 fixed to one of the first spring contact member 62 or the second spring contact member 64 and received within a central bore "D" defined by the spring body coils of each of the springs 60. Each spring support tube 84 supports its associated spring 60 and centrally positions the spring 60 away from contact with the semispherical wall of the spring receiving portion 80 of the second spring support member 56.

The turbine 22 of the torque converter assembly 14 is housed within a turbine housing 86 which is connected for rotation to the transmission input shaft 18. The turbine housing 86 is fixed to a turbine hub 88 for example by multiple fasteners 90 such as rivets. The turbine hub 88 is connected by a spline gear 92 to the transmission input shaft 18. A washer 94 is also fixed to the turbine hub 88 which pilots the turbine hub 88. The sun gear 46 is also splined to the turbine hub 88 using the spline gear 52.

Referring again to FIGS. 1 through 2, according to several aspects the input member of the torsional vibration damper 12 is the engine drive component 16 connected via the friction plate 36 to the first spring support member 40 when the torque converter is closed, and the transmission input shaft 18 defines the output member. The first spring support member 40 is connected to the carrier 54 by the springs 60. The friction plate 36 is connected to the first spring support member 40 and to the ring gear 50. The sun gear 46 is connected to the transmission input shaft 18, acting as the output member. Each of the pinion gears 48, which according to several aspects includes three pinion gears 48a, 48b, 48c are rotatably connected to the carrier 54 by the individual pinion shafts 68a, 68b, 68c. According to this aspect, the sun gear 46 is connected to the output member (transmission input shaft 18), and isolated using the springs 60 via the carrier 54 from the input member (engine drive component 16).

Referring to FIG. 3 and again to FIGS. 1 through 2, according to several aspects, the multiple springs 60 include six compression spring sets identified as spring sets 60a, 60b, 60c, 60d, 60e, 60f. The multiple spring sets 60a, 60b, 60c, 60d, 60e, 60f each have opposed ends 96, 98. Each of the opposed ends 96, 98 of each of the spring sets 60a, 60b, 60c, 60d, 60e, 60f has one of the multiple first spring contact members 62 and one of the multiple second spring contact members 64 positioned proximate thereto. The spring sets 60a, 60b, 60c, 60d, 60e, 60f are compressed during axial rotation of one or both of the first spring support member 40 or the second spring support member 56 with respect to the longitudinal central axis 74.

According to several aspects, each of the springs 60 in a non-deflected state occupies an arc length "AL1". Each of the first spring contact members 62 and the second spring contact members 64 occupies an arc length "AL2". According to further aspects, each of the springs 60 has a spring outside diameter (OD), the springs are positioned within the spring receiving portion 84 of the second spring support member 56, and a central axis of each of the springs 60 is positioned on a spring radius of curvature RC. For example, spring 60a is retained between and contacts a first spring contact member 62a and a second spring contact member 64a at a first end 96 of the spring 60a, and also contacts a first spring contact member 62b and a second spring contact member 64b at an opposite second end 98 of the spring 60a. An exemplary torsional rotation of the first spring support member 40 causes the first spring contact members 62 to compress each of the springs 60a, 60b, 60c, 60d, 60e, 60f against a next successive one of the second spring contact members 64 of the second spring support member 56 which is connected to the carrier 54.

Figure 3:
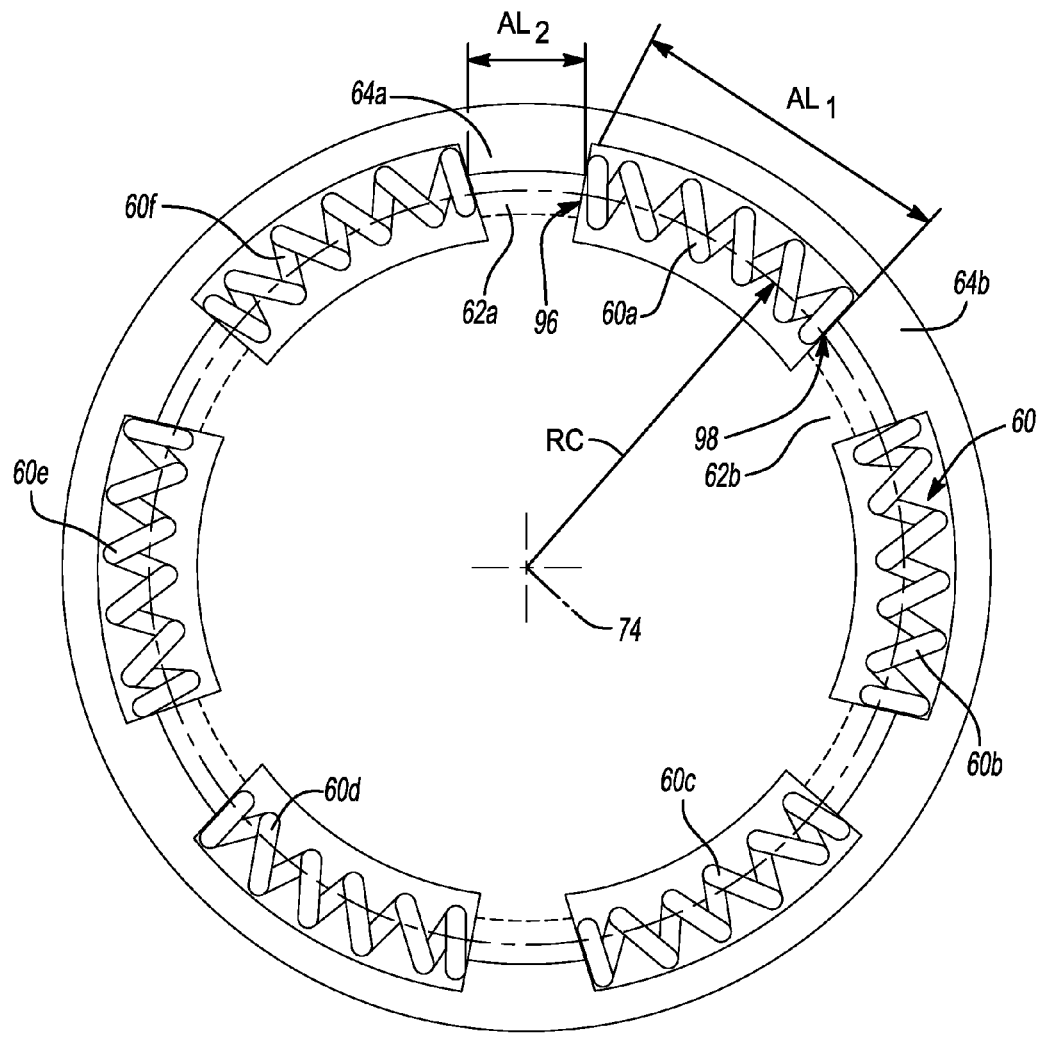
FIG. 3 is a partial cross sectional end elevational view taken at section 3 of FIG. 1.

Referring to FIG. 4 and again to FIGS. 1 through 3, the spring sets 60a, 60b, 60c, 60d, 60e, 60f are shown in their spaced apart alignment and positioned in the spring receiving portion 80 of the second spring support member 56. According to several aspects, three pinion gears 48, identified as pinion gears 48a, 48b, 48c are each rotatably mounted on the carrier 54. Gear teeth of the pinion gears 48 are meshed with external gear teeth of the centrally positioned sun gear 46, and with internal facing gear teeth of the ring gear 50. Portions of each of the first spring contact members 62 are visible in this view which are integrally connected to and extend substantially perpendicular to the first spring support member 40, which space successive ones of the springs 60a, 60b, 60c, 60d, 60e, 60f apart from each other. A portion of each of the second spring contact members 64 which are positioned proximate to each of the first spring contact members 62 are also visible in this view.

Figure 5:
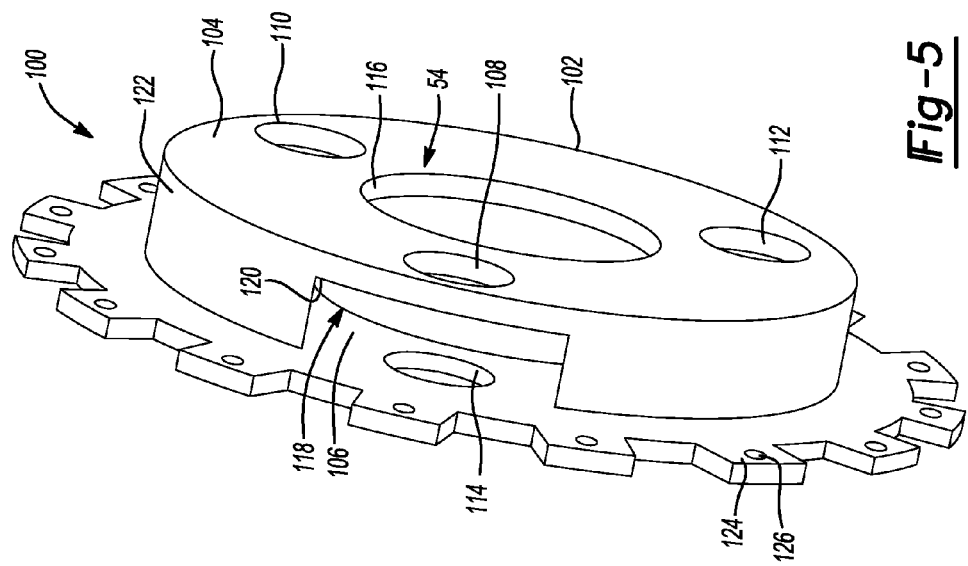
FIG. 5 is a left rear perspective view of a carrier assembly of the present disclosure.
Figure 4:
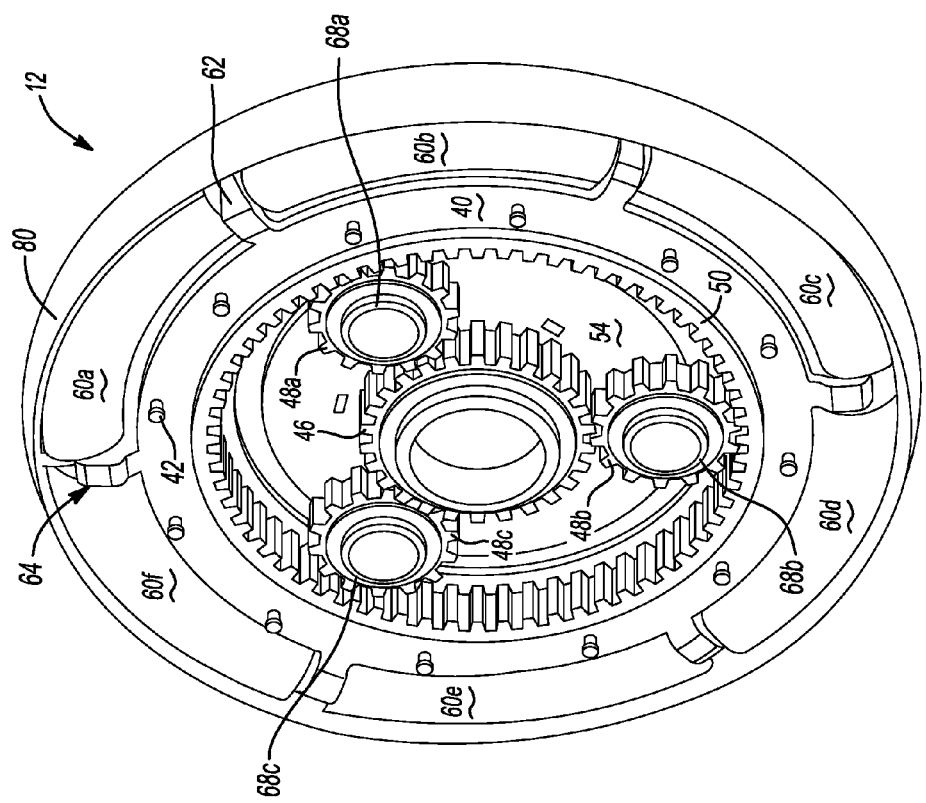
FIG. 4 is a front left perspective view of the planetary damper of FIG. 3.

Referring to FIG. 5 and again to FIGS. 1 through 2 and 4, a welded assembly 100 provides the carrier 54 welded to a cylinder 102. The welded assembly 100 includes a first carrier portion 104 and a second carrier portion 106 spaced apart from and parallel to the first carrier portion 104. Three bores 108, 110, 112 are created in the first carrier portion 104. Each of the three bores 108, 110, 112 is coaxially aligned with a bore created in the second carrier portion 106. For example, a bore 114 created in the second carrier portion 106 is coaxially aligned with the bore 108. Other bores in the second carrier portion 106 aligned with the bores 110, 112 are not visible in this view. The axially aligned bores created in the first carrier portion 104 and the second carrier portion 106 are used to rotatably mount pinion shafts 68 which rotatably receive the three pinion gears 48a, 48b, 48c shown and described in reference to FIG. 4. A central bore 116 is created in the first carrier portion 104 which is coaxially aligned with a central bore 118 created in the second carrier portion 106. The central bores 116, 118 provide space for positioning and axial rotation of the sun gear 46. Three arc shaped openings or windows 120 (only one of which is visible in this view) are created in a wall 122 of the cylinder 102, to allow for outward extension of the gear teeth of the three pinion gears 48a, 48b, 48c to mesh with the gear teeth of the ring gear 50 shown and described in reference to FIG. 4. Multiple tabs 124 extending radially outwardly from and integrally connected to the second carrier portion 106 of the carrier 54 each provide an aperture 126 which receive one of the fasteners 58 shown and described in reference to FIGS. 1 and 2.

Figure 6:
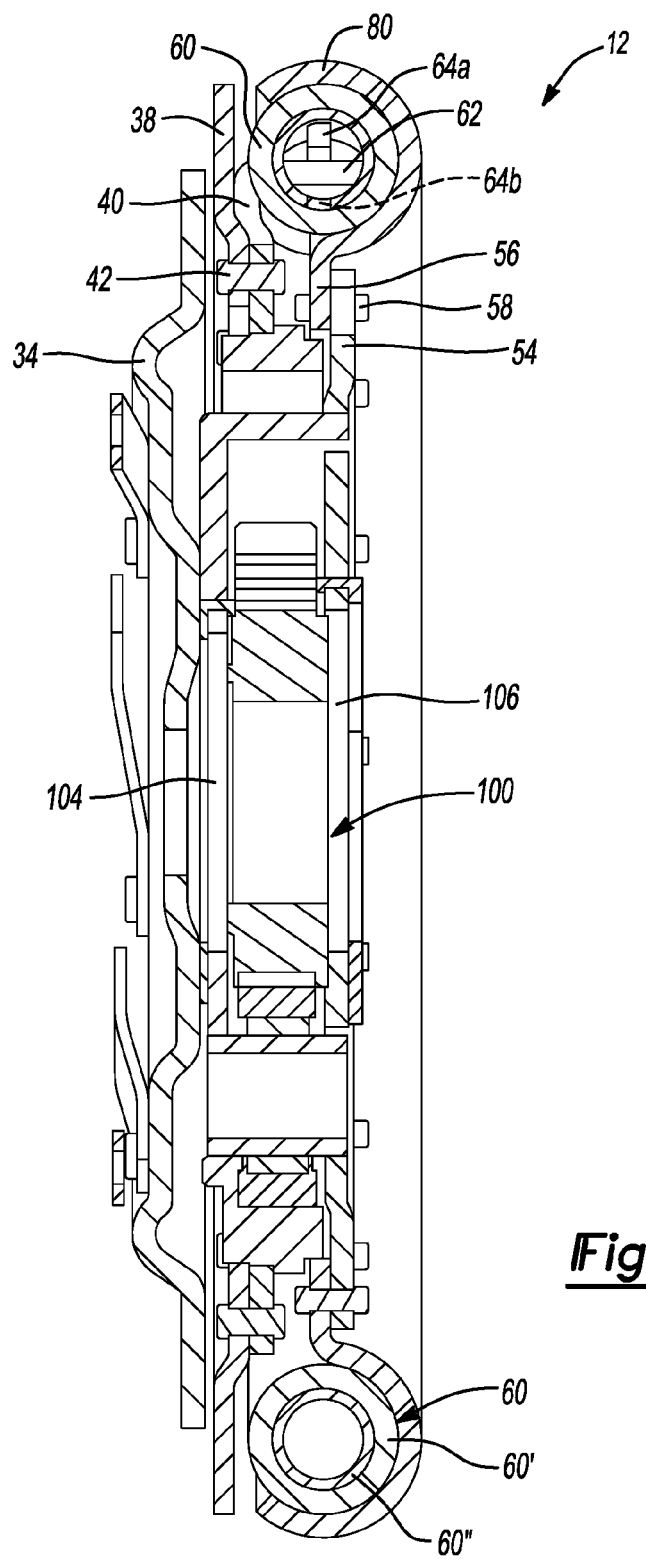
FIG. 6 is a front cross sectional view of the planetary damper of FIG. 1.

Referring to FIG. 6 and again to FIGS. 1 through 5, the configuration of the torsional vibration damper 12 is more clearly visible. The welded assembly 100 is centrally positioned and includes the first carrier portion 104 and the second carrier portion 106. The carrier 54 supports the second spring support member 56 and the spring receiving portion 80, which partially encloses the springs 60. The first contact member portions 64a, the second contact member portions 64b, and the first spring contact members 62 contact and compress the springs 60 when the carrier 54 coupled to the second spring support member 56 axially rotate with respect to the first spring support member 40. As previously discussed above, the first spring support member 40 is connected using the fasteners 42 to the connection plate 38, which is engaged by operation of the lock-up clutch piston or pressure plate 34 to rotatably engage the torsional vibration damper 12.

With reference again to FIGS. 3 and 6, the spring sets 60a, 60b, 60c, 60d, 60e, 60f can each include an individual coiled spring, or as most clearly shown in FIG. 6 can each include a nested pair of springs including an outer spring 60' and a smaller diameter inner spring 60" nested within the outer spring 60'. According to several aspects, clearance can be provided between the outer spring 60' and the inner spring 60" to minimize frictional contact between the spring set pairs. According to other aspects, the first spring contact members 62 and both the first contact member portions 64a and the second contact member portions 64b contact both the outer spring 60' and the inner spring 60" in a deflected or compressed condition of the springs, but contact only the outer spring 60' in a non-deflected condition of the spring sets.

It should also be appreciated that the torsional vibrational damper 12 may have other configurations, such as having fewer or greater than six springs, springs in parallel, and modifications with respect to the quantity of planet gears of the planetary gear set 44 without departing from the scope of the present disclosure.

It is well known that to achieve more effective torsional vibration isolation it is desirable to reduce the spring coefficient and provide a larger maximum angular displacement between an input member such as an input shaft and an output member such as an output shaft of the vibration damper. Known torsional vibration dampers using springs to dampen torsional vibration are limited by the spring coefficient and spring length, and therefore have a limited angular displacement of the isolator components. By the additional use of the planetary gear set 44 described herein, a significant decrease in the spring coefficient and an increase in a maximum angular displacement of the damper is achieved.

The description of the invention is merely exemplary in nature and variations that do not depart from the general gist of the invention are intended to be within the scope of the invention. Such variations are not to be regarded as a departure from the spirit and scope of the invention.

What is claimed is:

1. A torsional vibration damper for a motor vehicle, comprising:
a planetary gear set connected to a transmission input shaft, the planetary gear set including at least a carrier and a ring gear; and
a spring cage including:
a first spring support member connected to the ring gear, the first spring support member having multiple first spring contact members extending away from the first spring support member and each oriented at a first angle;
a second spring support member connected to the carrier and rotatable with respect to the first spring support member, the second spring support member having multiple second spring contact members each oriented at a second angle different from the first angle, each of the second spring contact members being divided into a first contact member portion and a second contact member portion;
multiple springs each having opposed ends, the springs positioned between and compressible by rotation of one of the first spring support member or the second spring support member;

each of the opposed ends of the springs having one of each the first and the second spring contact members positioned proximate thereto, the difference between the first angle and the second angle providing even compression of each of the springs, thereby mitigating against spring lateral deflection and frictional contact between the springs and either of the first spring support member or the second spring support member;

the first spring contact members include a first member longitudinal axis which intersects with a central axis of the springs; and the first contact member portion and the second contact member portion of individual ones of the second spring contact members are coaxially aligned and define a second member longitudinal axis which intersects with the central axis of the springs.

2. The torsional vibration damper for a motor vehicle of claim 1, wherein the angular orientation is used between the second member longitudinal axis and the first member longitudinal axis.

3. The torsional vibration damper for a motor vehicle of claim 1, wherein a spacing between the first contact member portion and the second contact member portion provides clearance for positioning the first spring contact member between the first contact member portion and the second contact member portion in a non-deflected condition of the springs.

4. The torsional vibration damper for a motor vehicle of claim 1, wherein:
the planetary gear set includes a sun gear connected for rotation to the transmission input shaft;
the planetary gear set includes multiple planet gears rotatably supported on the carrier, each meshed with the sun gear; and
the ring gear is meshed with the planet gears.

5. The torsional vibration damper for a motor vehicle of claim 4, wherein the sun gear is connected to a torque converter hub which is connected to the transmission input shaft.

6. The torsional vibration damper for a motor vehicle of claim 1, further including a connection plate directly connected to the first spring support member.

7. The torsional vibration damper for a motor vehicle of claim 6, further including:
a torque converter lock-up clutch plate fixed to the connection plate; and
a torque converter lock-up clutch piston coupled to the torque converter lock-up clutch plate and a torque converter lock-up clutch when the clutch is closed.

8. The torsional vibration damper for a motor vehicle of claim 1, wherein an angular orientation between individual ones of the first and the second spring contact members defines a perpendicular orientation.

9. The torsional vibration damper for a motor vehicle of claim 1, wherein the second spring support member has a semi-spherical shape.

10. The torsional vibration damper for a motor vehicle of claim 9, wherein the semi-spherical shape defines an arc length greater than 90 degrees.

11. The torsional vibration damper for a motor vehicle of claim 1, further including a spring support tube connected to individual ones of the first spring contact members or the second spring contact members, the spring support tube received within a central bore of each of the springs.

12. A torsional vibration damper for a motor vehicle, comprising:

a planetary gear set connected to a transmission input shaft, the planetary gear set including a sun gear, a carrier, and a ring gear; and a spring cage including:
a first spring support member connected to the ring gear, the first spring support member having multiple first spring contact members each aligned on a first member longitudinal axis;

a second spring support member connected to the carrier and rotatable with respect to the first spring support member, the second spring support member having multiple second spring contact members, each separable as a first contact member portion and a second contact member portion, each of the first contact member portion and the second contact member portion coaxially aligned on a second member longitudinal axis, the first spring support member extending into a space between the first contact member portion and the second contact member portion, with the first member longitudinal axis angularly oriented with respect to the second member longitudinal axis;

multiple spring sets each having nested inner and outer springs each spring of the spring sets having opposed ends, the springs positioned between and compressible by rotation of one of the first spring support member or the second spring support member; and each of the opposed ends of the outer springs being contacted by one of the multiple first spring contact members or one of the multiple second spring contact members in a non-deflected condition of the springs.

13. The torsional vibration damper for a motor vehicle of claim 12, wherein the second member longitudinal axis intersects with a central axis of the spring.

14. The torsional vibration damper for a motor vehicle of claim 12, wherein the angular orientation of the first member longitudinal axis is used with respect to the second member longitudinal axis.

15. The torsional vibration damper for a motor vehicle of claim 12, further including a connection plate directly connected to the first spring engagement element.

16. The torsional vibration damper for a motor vehicle of claim 15, wherein the connection plate is connected to the ring gear of the planetary gear set.

17. The torsional vibration damper for a motor vehicle of claim 15, wherein the connection plate is connected to an engine drive component.

18. A powertrain for a motor vehicle comprising:
an engine disposed in the motor vehicle and having an engine output member connected to a flex plate;
an automatic transmission connected to the engine having a transmission input shaft;
a torque converter connected to the transmission input shaft of the automatic transmission; and
a torsional vibration damper connected between the engine output member and the transmission input shaft, the torsional vibration damper including:
a planetary gear set connected to a transmission input shaft, the planetary gear set including a sun gear, a carrier, and a ring gear; and
a spring cage including:
a first spring support member connected to the ring gear, the first spring support member having multiple first spring contact members each aligned on a first member longitudinal axis;

a second spring support member connected to the carrier and rotatable with respect to the first spring support member, the second spring support member having multiple second spring contact members, each separable as a first contact member portion and a second contact member portion, each of the first contact member portion and the second contact member portion coaxially aligned on a second member longitudinal axis, the first spring support member extending into a space between the first contact member portion and the second contact member portion, with the first member longitudinal axis angularly oriented with respect to the second member longitudinal axis;

multiple springs each having opposed ends, the springs positioned between and compressible by rotation of one of the first spring support member or the second spring support member, the multiple springs compressing and extending to absorb vehicle engine vibration pulses; and each of the opposed ends of the multiple springs being contacted by one of the multiple first spring contact members or one of the multiple second spring contact members in a non-deflected condition of the springs.

* * * * *